United States Patent Office 3,631,155
Patented Dec. 28, 1971

3,631,155
POLY 1,2 - BIS(DIFLUOROAMINO)ETHYL URETHANES AND THEIR PREPARATION
Robert A. Smiley, Woodbury, N.J., assignor to E. I. du Pont de Nemours and Company, Wilmington, Del.
No Drawing. Continuation-in-part of application Ser. No. 28,804, May 12, 1960. This application Jan. 19, 1961, Ser. No. 83,837
Int. Cl. C08g 22/20
U.S. Cl. 260—77.5 CR          18 Claims

ABSTRACT OF THE DISCLOSURE

Polyurethanes prepared by reaction of 1,2-bis(difluoroamino)ethyl isocyanate with aliphatic polyhydric alcohols.

This is a continuation-in-part of application Ser. No. 28,804, filed May 12, 1960, and now abandoned.

The present invention relates to novel polyurethanes prepared by the reaction of 1,2-bis(difluoroamino)ethyl isocaynate with aliphatic polyhydric alcohols.

In recent years, great interest has arisen in compounds containing the —$NF_2$ group for use as high-energy ingredients for rocket propellants. Compounds containing a high percentage by weight of —$NF_2$ groups have been found to impart a high specific impulse to rocket propellants. Of particular interest are solid compounds, which may themselves be used as high-energy binders; or liquid compounds, which may be incorporated into solid formulations.

The novel compounds of the present invention are solid or liquid compounds containing up to 51% by weight of —$NF_2$ groups and, as such, are highly desirable for use in rocket propellant formulations. The novel compounds are polyurethanes having a pendent molecular structure, i.e., compounds containing two or more urethane (—NHCOO—) linkages pendent from the backbone structure of the molecule rather than in the backbone structure itself. These polyurethanes are prepared from a particular monoisocyanate and a polyhydric alcohol.

I have found that novel polyurethanes containing a plurality of —$NF_2$ groups can be prepared by reacting 1, 2 - bis(difluoroamino)ethyl isocyanate with an aliphatic polyhydric alcohol, i.e., an alcohol containing two or more hydroxyl groups, preferably in the presence of a catalyst, for example, ferric acetylacetonate.

The polyurethane products of the invention can be represented by the following Formula I which shows a plurality, $n$, of 1,2-bis(difluoroamino)ethyl urethane groups,

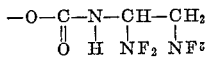

attached to a radical, R, which results from the removal of $n$ hydroxyl groups from a polyhydric alcohol:

I
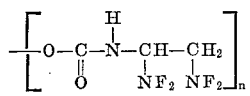

The number of urethane groups, $n$, in Formula I can vary from 2 to 30,000. In general, it corresponds to the number of hydroxyl groups in the polyhydric alcohol with which the 1,2-bis(difluoroamino)ethyl isocyanate is reacted; for example, with a product made using a dihydric alcohol such as ethylene glycol, $n$ will be 2, with a disaccharide such as sucrose, it will be 8, with a polyvinyl alcohol, $n$ can vary from 2 to about 30,000 depending upon the degree of polymerization of the polyvinyl alcohol, and with nitrocellulose, from 2 to about 1000.

The following examples serve to illustrate specific embodiments of the method of preparing the novel compounds of the present invention. However, the examples will be understood to be illustrative only and not to limit the invention in any manner. The parts in the examples are parts by weight. In the syntheses described in each of the following examples, 1,2 - bis(difluoroamino)ethyl isocyanate was prepared by the Curtius rearrangement of acrylyl azide to vinyl isocyanate, followed by the reaction of the isocyanate with tetrafluorohydrazine. The procedure was as follows:

Sodium azide (428 parts) was dissolved in 1000 parts of water in a 3-liter three-necked flask fitted with a stirrer, thermometer, and dropping funnel. Then a solution of 362 parts of acrylyl chloride (prepared from acrylic acid and benzoyl chloride) in 1600 parts of chloroform was added dropwise to the stirred sodium azide solution over a period of 6 hours. The reaction temperature was maintained at 15–20° C. by means of an ice-water bath. The chloroform layer was separated, and the aqueous layer extracted several times with chloroform. The extracts were added to the chloroform layer containing the product (acrylyl azide) and the solution was dried overnight over magnesium sulfate.

After removal of the drying agent, the solution was placed in a 3-liter distilling flask attached to a 4-foot distilling column packed with stainless steel helices. The vent from the stillhead was attached by rubber tubing to a Dry Ice-acetone trap. Five parts of hydroquinone was added to the distilling flask and the flask heated slowly to effect rearrangement of the acrylyl azide to vinyl isocyanate. The latter was distilled at 39° C. and atmospheric pressure; the distillate amounted to 223 parts (81% yield) of vinyl isocyanate.

The reaction of vinyl isocyanate with tetrafluorohydrazine was carried out by passing equimolar amounts of the reactants (as gases) through coils made of ¼-inch copper tubing and heated to 155° C. The 1,2-bis(difluoroamino)ethyl isocyanate formed was condensed in a Dry Ice-acetone trap, removed therefrom, and distilled under vacuum (50° C. at 60 mm.). The structure of the product was confirmed by its infrared spectrum, which showed a strong isocyanate band at 4.38μ, medium bands at 9.65μ and 10.15μ, and strong —$NF_2$ bands at 11.45μ and 12.30μ.

The preparation of 1,2-bis(difluoroamino)ethyl isocyanate, described above, may be represented by the following series of equations:

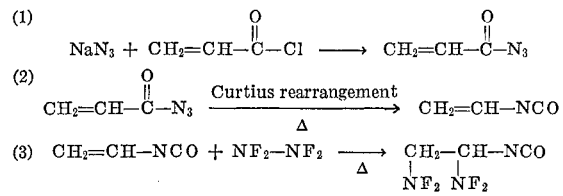

EXAMPLE 1

Polyvinyl alcohol (0.88 part) having a degree of polymerization of about 3,000 (molecular weight of about 130,000) was dissolved in 20 parts of hot (100° C.) dimethyl sulfoxide. The solution was cooled, and then 0.01 part of ferric acetylacetonate was added thereto, whereupon the solution turned orange. 1,2-bis(difluoroamino) ethyl isocyanate (3.8 parts) was added dropwise to the stirred polyvinyl alcohol solution, the temperature of the reaction mixture being maintained below 45° C. during the addition. The mixture became progressively lighter in color during the addition. After all of the isocyanate had been added, the mixture was stirred for 30 minutes, during which time the color of the mixture darkened to the orange color of the original alcohol solution. The mixture was poured into 500 parts of water in a Waring Blendor and mixed thoroughly. The tan solid which precipitated was filtered off, washed twice in water in the Waring Blendor, and then sucked dry on a filter. The product then was washed in chloroform and dried (2.8 parts of product obtained). Infrared spectroscopy confirmed the presence of the urethane structure and the —NF$_2$ group as well as the absence of the isocyanate group. Elemental analysis revealed that the product had a carbon, hydrogen, and nitrogen content which agreed closely with the carbon, hydrogen, and nitrogen content calculated for $$C_5H_7N_3O_2F_4$$

the empirical formula for the recurring structural unit:

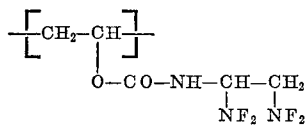

Calculated (percent): C, 27.6; H, 3.2; N, 19.35. Found (percent): C, 27.3; H, 3.0; N, 17.8.

The slight difference between the calculated and found nitrogen content indicated that about 90% of the hydroxyl groups in the polyvinyl alcohol had reacted.

The same compound was obtained when the above procedure was repeated with the omission of the ferric acetylacetonate. In this case, however, the mixture was stirred for two hours after the addition of the isocyanate.

The novel polyurethane contains 48% —NF$_2$ groups by weight and is soluble in acetone but insoluble in water. The polyurethane can be cast to a transparent film from acetone solution and can be plasticized by various liquids to give an elastomeric solid.

A polyurethane containing —NF$_2$ groups also was prepared by carrying out the above procedure with polyvinyl alcohol having a degree of polymerization of about 25,000 (molecular weight of about $11 \times 10^5$) and N-methylpyrrolidone instead of dimethyl sulfoxide as solvent.

EXAMPLE 2

Ferric acetylacetonate (0.01 part) was added to a solution of 2.75 parts of polyvinyl alcohol (degree of polymerization of about 50; average molecular weight: 1500–3000) in 35 parts of dimethyl sulfoxide. The solution was orange in color. Then 10.8 parts of 1,2-bis(difluoroamino) ethyl isocyanate was added dropwise to the stirred polyvinyl alcohol solution, the temperature of the reaction mixture being maintained at 18–20° C. during the addition. Addition of the isocyanate caused a progressive lightening of the orange color of the polyvinyl alcohol solution. After completion of the addition of the iscyanate, the mixture was stirred for one hour, during which time a temperature of 20–25° C. was maintained. The color of the reaction mixture thereby gradually darkened to the original orange color. The reaction mixture was poured into 500 parts of water in a Waring Blendor and mixed thoroughly. The solid product was filtered off and washed twice with water in the Waring Blendor. After air-drying, 8.9 parts of a very fine, light-tan powder was obtained.

The infrared spectrum of the compound showed —NH absorption at 2.99μ, carbonyl at 5.78μ, urethane at 6.54μ, and —NF$_2$ at 11.49μ. There was no isocyanate band.

Elemental analysis revealed that the product had a carbon, hydrogen, and nitrogen content which agreed closely with the carbon, hydrogen, and nitrogen content calculated for C$_5$H$_7$N$_3$O$_2$F$_4$, the empirical formula for the recurring structural unit:

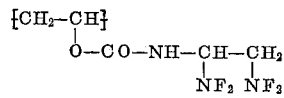

The novel polyurethane contains 48% of —NF$_2$ groups by weight. This polyurethane is very soluble is acetone but insoluble in water. It softened at 110° C., and turned brown at 125° C.

EXAMPLE 3

1,2-bis(difluoroamino)ethyl isocyanate (3.0 parts) was added dropwise to a stirred solution of 0.68 part of sucrose in 20 parts of dimethyl sulfoxide containing 0.01 part of ferric acetylacetonate, cooling being applied occasionally during the addition to maintain the temperature below 45° C. The initially orange color of the sucrose solution became progressively lighter during the addition of the isocyanate. After all of the isocyanate had been added, the mixture was stirred for 30 minutes, during which time the color of the mixture gradually returned to the orange of the original sucrose solution. The mixture was worked up in the same manner as the reaction mixture of Example 1. The product, a solid soluble in acetone and insoluble in water, was obtained in the amount of 1.9 parts. Infrared spectroscopy confirmed the presence of the urethane structure and the —NF$_2$ group, and the absence of the isocyanate group. Elemental analysis disclosed a carbon, hydrogen, and nitrogen content in agreement with the carbon, hydrogen, and nitrogen content calculated for $$C_{36}H_{46}N_{24}O_{19}F_{32}$$

the empirical formula for the octaurethane from sucrose and 1,2-bis(difluoroamino)ethyl isocyanate. This octaurethane, which contained 48% by weight of —NF$_2$ groups, may be represented by the following formula:

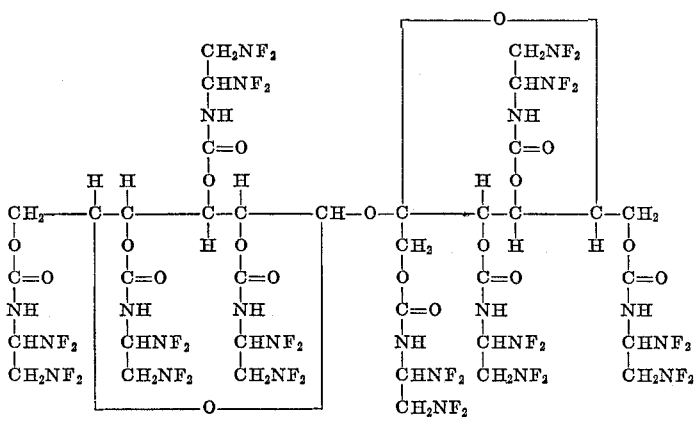

EXAMPLE 4

Ferric acetylacetonate (0.1 part) was added to a solution of 0.5 part of glycerol in 10 parts of dimethyl sulfoxide, the catalyst-containing solution being orange in color. 1,2 - bis(difluoroamino)ethyl isocyanate (3.0 parts) was added dropwise to the stirred glycerol solution maintained at a temperature below 45° C., the color of the solution becoming lighter during the addition. After completion of the addition, the mixture was stirred for 30 minutes, whereupon the orange color returned. The mixture was poured into 200 parts of water. The water-insoluble product was extracted with ethyl ether and the extract washed with water and dried over magnesium sulfate. The product, a viscous, yellow liquid, was obtained in the amount of 3.2 parts. Infrared spectroscopy confirmed the presence of the urethane structure and the —$NF_2$ group. Elemental analysis disclosed a carbon, hydrogen, and nitrogen content which agreed with the carbon, hydrogen, and nitrogen content calculated for $C_{12}H_{17}N_9O_6F_{12}$, the empirical formula for the triurethane from glycerol and 1,2-bis(difluoroamino)ethyl isocyanate. The triurethane, which contained 51% by weight of —$NF_2$ groups, may be represented by the following formula:

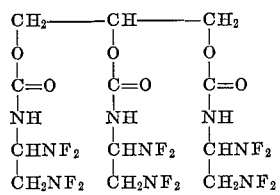

This viscous liquid polyurethane is a plasticizer for polyurethanes prepared in Examples 1 and 2.

EXAMPLE 5

Ferric acetylacetonate (0.01 part) was added to a solution of 0.68 part of pentaerythritol in 10 parts of dimethyl sulfoxide. 1,2 - bis(difluoroamino)ethyl isocyanate (3.46 parts) was added dropwise to the stirred pentaerythritol solution maintained at a temperature below 45° C. After completion of the addition, the mixture was stirred for 120 minutes. The same color changes as described in the previous examples occurred. The mixture was worked up in the same manner as the reaction mixture of Example 4. The product, which was obtained in the amount of 3.5 parts, was a very viscous liquid, very sticky, elastomeric, and taffy-like in consistency. Infrared spectroscopy confirmed the presence of the urethane structure and the —$NF_2$ group. Elemental analysis disclosed a carbon, hydrogen, and nitrogen content which agreed closely with the carbon, hydrogen, and nitrogen content calculated for $C_{17}H_{24}N_{12}O_8F_{16}$, the empirical formula for the tetraurethane from pentaerythritol and 1,2 - bis(difluoroamino)ethyl isocyanate. The tetraurethane, which contained 50% by weight of —$NF_2$ groups, may be represented by the following formula:

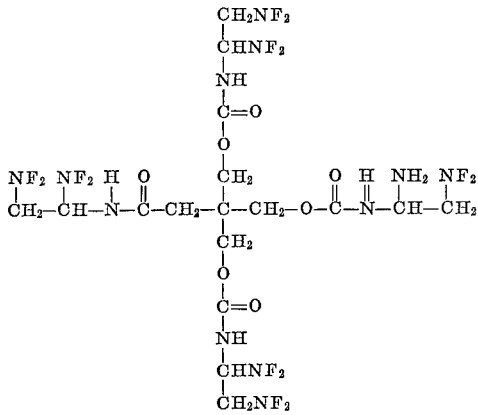

EXAMPLE 6

1,5 - hexadiene - 3,4 - diol (1.14 parts) was dissolved in 10 parts of dimethyl sulfoxide, and 0.01 part of ferric acetylacetonate was added to the solution. 1,2 - bis(difluoroamino)ethyl isocyanate (3.46 parts) was then added with stirring over a period of 20 minutes, a temperature of 20–25° C. being maintained. After the addition of the isocyanate, the mixture was stirred for 10 minutes and then poured into 200 parts of water. The same color changes occurred during the reaction as were described in the previous examples. The water-insoluble product was extracted with ethyl ether and the extract washed with water and dried over magnesium sulfate. After separation of the drying agent, the ether was evaporated off in vacuo to give 2.4 parts of a viscous yellow liquid. The infrared spectrum of the compound showed —NH absorption at 2.99μ, carbonyl at 5.78μ, urethane at 6.49μ, and —$NF_2$ at 11.46μ and 12.25μ. Absence of bands at 2.89μ (—OH group) and 4.25μ (isocyanate) indicated complete reaction of the hydroxyl and isocyanate groups.

Elemental analysis revealed that the product had a carbon, hydrogen, and nitrogen content which agreed closely with the carbon, hydrogen, and nitrogen content calculated for $C_{12}H_{16}N_6O_4F_8$, the empirical formula for the diurethane from 1,2 - bis(difluoroamino)ethyl isocyanate and 1,5 - hexadiene - 3,4 - diol. The diurethane, which contained 45% by weight of —$NF_2$ groups, may be represented by the following formula:

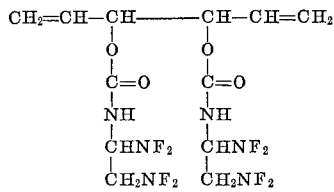

EXAMPLE 7

The procedure of Example 6 was repeated except that 0.88 part of 2-butene-1,4-diol was substituted for the hexadienediol. The product obtained (3.25 parts) was a viscous yellow-liquid which crystallized slowly to a white solid, melting at 69–71° C. The infrared spectrum of the compound showed a sharp —NH band at 3.00μ, sharp carbonyl at 5.81μ, urethane at 6.45μ, and —$NF_2$ absorption at 11.46μ and 12.15μ. Elemental analysis disclosed a carbon, hydrogen, and nitrogen content which agreed with the carbon, hydrogen, and nitrogen content calculated for $C_{10}H_{14}N_6O_4F_8$, the empirical formula for the diurethane from 1,2-bis(difluoroamino)ethyl isocyanate and 2-butene - 1,4 - diol. The diurethane, which contained 48% by weight of —$NF_2$ groups, may be represented by the following formula:

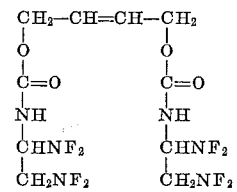

EXAMPLE 8

1,3-dihydroxy-2-propanone (0.90 part) was dissolved in 10 parts of dimethyl sulfoxide, and 0.01 part of ferric acetylacetone was added to the solution. 1,2-bis(difluoroamino)ethyl isocyanate (3.46 parts) was then added with stirring over a period of 20 minutes, a temperature of 20–25° C. being maintained. After the addition of the isocyanate, the mixture was stirred for 10 minutes and then poured into 200 parts of water. The same color changes occurred during the reaction as were described in the previous examples. The water-insoluble product was extracted with ethyl ether and the extract washed with water and dried over magnesium sulfate. After separation of the drying agent, the ether was evaporated off in vacuo to give 2.6 parts of a very viscous yellow liquid. The infrared spectrum showed an —NH band at 2.99μ, no isocyanate, a broad carbonyl centered at 5.74μ with a shoulder at 5.5μ, urethane at 6.45μ, and strong —$NF_2$ at 11.45μ and 12.25μ. Elemental analysis showed a carbon, hydrogen, and nitrogen content which agreed with the carbon, hydrogen, and nitrogen content calculated for $C_9H_{12}N_6O_5F_8$, the empirical formula for the diurethane from 1,2-bis(difluoroamino)ethyl isocyanate and 1,3-dihydroxy-2-propanone. The diurethane, which contained 48% by weight of —NF₂ groups, may be represented by the following formula:

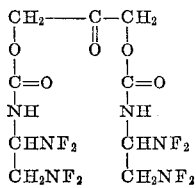

EXAMPLE 9

The procedure of Example 6 was repeated with the exception that 0.86 part of 2-butyne-1,4-diol was substituted for the hexadienediol. The product obtained (3.4 parts) was a viscous yellow liquid which crystallized slowly to a white solid. The infrared spectrum of the compound showed an —NH band at 3.00µ, urethane at 5.78µ and 6.45µ, and strong —NF₂ absorption at 11.46µ and 12.25µ. Elemental analysis disclosed a carbon, hydrogen, and nitrogen content which agreed with the carbon, hydrogen, and nitrogen content calculated for $C_{10}H_{12}N_6O_4F_8$, the empirical formula for the diurethane from 1,2-bis(difluoroamino)-ethyl isocyanate and 2-butyne-1,4-diol. The diurethane, which contained 48% by weight of —NF₂ groups, may be represented by the following formula:

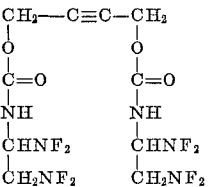

EXAMPLE 10

1,2-bis(difluoroamino)ethyl isocyanate (2.59 parts) reacted with 0.75 part of 2-(hydroxymethyl)-2-nitro-1,3-propane-diol in 10 parts of dimethyl sulfoxide and in the presence of 0.01 part of ferric acetylacetonate at 20–25° C. according to the procedure described in the preceding examples. The reaction mixture was stirred for 20 minutes. The product (2.0 parts) was a very viscous yellow liquid, the infrared spectrum of which showed —NH at 2.97µ, urethane at 5.73µ and 6.41µ, —NF₂ at 11.45µ and 12.25µ, and tertiary nitro absorption at 6.50µ and 7.40µ. Elemental analysis disclosed a carbon, hydrogen, and nitrogen content which agreed with the carbon, hydrogen, and nitrogen content calculated for $C_{13}H_{18}N_{10}O_8F_{12}$, the empirical formula for the triurethane from 1,2-bis(difluoroamino)ethyl isocyanate and 2-(hydroxymethyl)-2-nitro-1,3-propanediol. The triurethane, which contained 47% by weight of —NF₂ groups, may be represented by the following formula:

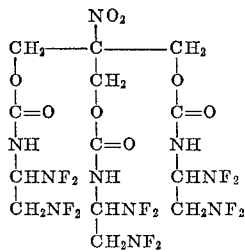

EXAMPLE 11

Nitrocellulose (2.5 parts) having a 10.9–11.2% nitrogen content and a viscosity of 0.5 sec. was dissolved in 22.2 parts of tetrahydrofuran, and 0.02 part of dimethyltin dichloride was added to the solution. A mixture (3.4 parts) of 1,2-bis(difluoroamino)ethyl isocyanate and cyclohexanone containing 95% of the isocyanate was added to the solution and the resulting mixture was refluxed (at about 80° C.) for five hours. The mixture then was poured into 500 parts of ice water in a Waring Blendor and mixed thoroughly. The solid product which formed was filtered off, washed once in distilled water in the Waring Blendor, filtered off again, and dried overnight over phosphorus pentoxide in a vacuum desiccator (4.7 parts of product obtained). Infrared spectroscopy showed urethane absorption in the carbonyl region and at 6.5µ. There was —NF₂ absorption at 11.5µ. Elemental analysis revealed that the product had a nitrogen and fluorine content which agreed closely with the nitrogen and fluorine content calculated for $C_9H_{11}N_5O_{10}F_4$, the empirical formula for the recurring structural unit:

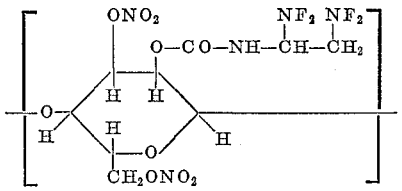

Calculated (percent): N, 16.46; F, 17.88. Found (percent): N, 15.75, 15.78; F, 17.97, 18.46.

EXAMPLE 12

The procedure of Example 11 was repeated except that the nitrocellulose used had a viscosity of 40–60 sec.; 39.6 parts of acetone was substituted for the 22.2 parts of tetrahydrofuran; the amount of dimethyltin dichloride used was 0.03 part; the amount of isocyanate-cyclohexanone mixture used was 3.5 parts; and the reflux time (at 56° C.) was 2.5 hours. Elemental analyses on the product (3.9 parts obtained) were as follows: N, 16.09; 16.19. F, 18.28; 18.19.

As is shown in the foregoing examples, 1,2-bis(difluoroamino)ethyl isocyanate reacts with a wide variety of polyhydric alcohols to produce polyurethanes containing up to 51% by weight of —NF₂ groups. Whether or not a solvent for the alcohol is used depends on the properties of the particular alcohol in question. In most cases, however, the use of a solvent for the alcohol to increase fluidity is desirable. Any solvent for the alcohol which is not reactive with the isocyanate can be used, i.e., a solvent which does not have an active hydrogen atom in the molecule. While the polymeric alcohols, such as polyvinyl alcohol, are soluble in only a few organic solvents, other alcohols are soluble in a great variety of solvents. Dimethyl sulfoxide, a solvent in which most alcohols are soluble, is not reactive with the isocyanate at temperatures below 45° C., although it becomes reactive at higher temperatures; thus dimethyl sulfoxide can be used provided the reaction is carried out at a temperature below about 45° C. Other solvents such as acetone, N-methylpyrrolidone, tetrahydrofuran, ethylene glycol dimethyl ether, and various other ketones and ethers are essentially nonreactive with the isocyanate; when the alcohol is soluble in these solvents, the only restriction on the reaction temperature is that it should not reach the decomposition temperature of one of the reactants or the product. I prefer to operate at a temperature between room temperature, i.e., 20° C., and the boiling point at atmospheric pressure of any of the components in the reaction mixture.

Because 1,2-bis(difluoroamino)ethyl isocyanate is sensitive to shock, it may be desirable to add a minor amount of a stabilizer thereto prior to reaction with the polyhydric alcohol. I have found that the addition of about five percent by weight of cyclohexanone to the isocyanate greatly reduces the shock sensitivity of the material.

While a catalyst is not essential to the obtaining of the novel compounds of the present invention, the use of a catalyst in the preparation process is preferred inasmuch as the reaction time is thereby reduced. Although ferric acetylacetonate and dimethyltin dichloride were the catalysts used in the exemplified syntheses, other compounds known to catalyze the reaction of isocyanates with alcohols are likewise useful. Preferably, the catalyst should be soluble in the reaction medium.

I have found that polyurethanes containing —NF$_2$ groups are obtained by the reaction of 1,2-bis(difluoroamino)ethyl isocyanate with a wide variety of saturated and unsaturated alcohols containing two or more hydroxyl groups in the molecule. As is shown in the foregoing examples, the alcohol may be a dihydric alcohol (1,5-hexadiene-3,4-diol, 2-butene-1,4-diol, 2-butyne-1,4-diol, and 1,3-dihydroxy-2-propanone), a trihydric alcohol (glycerol), a tetritol, i.e., an alcohol containing four hydroxyl groups (pentaerythritol), a disaccharide (containing eight hydroxyl groups, e.g., sucrose), or a polymeric alcohol (polyvinyl alcohol and nitrocellulose). Thus, the number of hydroxyl groups in the alcohol is not a limiting feature, and other alcohols which may be used are (1) glycols, e.g., dihydroxy compounds of the general formula $C_nN_{2n}(OH)_2$, where $n=2-6$, and glycol ethers, e.g., diethylene and triethylene glycols; (2) other trihydroxy compounds, e.g., trimethylolpropane; (3) other tetritols, e.g., erythritol and D- and L-threitol; (4) pentitols, i.e., pentahydroxy alcohols, such as ribitol, xylitol, and D- and L-arabitol; (5) hexitols, i.e., hexahydroxy alcohols, such as dulcitol, sorbitol, D-mannitol, L-iditol, D-talitol, and allitol; (6) cyclic hexahydric alcohols, e.g., meso-inositol, scyllitol, and D- and L-inositol; (7) heptitols, i.e., heptahydric alcohols, such as D-$\alpha$- and D-$\beta$-mannoheptitol; (8) monosaccharides, e.g., glucose and fructose; (9) other disaccharides, such as lactose, maltose, and cellobiose; and (10) polysaccharides, such as cellulose. As is shown in the examples, unsaturated alcohols such as 2-butene-1,4-diol, 1,5-hexadiene-3,4-diol, and 2-butyne-1,4-diol also may be used. In addition, the polyhydric alcohol may contain other substituents in the molecule, such as nitro, nitrate, or keto substituents (Examples 8, 10, 11, and 12).

When a polymeric alcohol is used in the preparation of the polyurethane, the molecular weight of the alcohol has no critical effect on the results obtained. Thus, we have prepared novel polyurethanes from polyvinyl alcohol having degrees of polymerization ranging from 50 to 25,000, and from nitrocellulose having viscosities ranging from 0.5 second to 40–60 seconds.

The invention has been described in detail in the foregoing. It will be apparent to those skilled in the art that many variations are possible without departure from the scope of the invention. Therefore, I intend to be limited only by the following claims.

I claim:
1. As a new composition of matter:

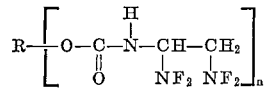

wherein R is a polyhydric alcohol from which $n$ hydroxyl groups have been extracted and which is free of non-hydroxyl functional groups other than a member selected from the class consisting of nitro, nitrato, and keto, and where $n$ is an integer of from 2 to 30,000.

2. As a new composition of matter:

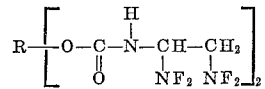

where R is a dihydric alcohol from which two hydroxyl groups have been extracted and which is free of non-hydroxyl functional groups other than a member selected from the class consisting of nitro, nitrato, and keto.

3. As a new composition of matter:

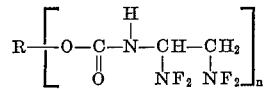

wherein R is a polyvinyl alcohol molecule from which $n$ hydroxyl groups have been extracted and $n$ is an integer of from 2 to 30,000.

4. The polyurethane defined by claim 3.

5. As a new composition of matter:

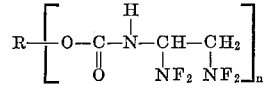

where R is a nitrocellulose molecule from which $n$ hydroxyl groups have been extracted and $n$ is an integer of from 2 to 1000.

6. The polyurethane defined by claim 5.

7. As a new composition of matter:

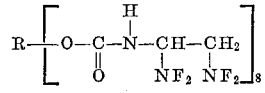

wherein R is a disaccharide from which 8 hydroxyl groups have been extracted.

8. The polyurethane defined by claim 7.

9. A new compound represented by the following formula

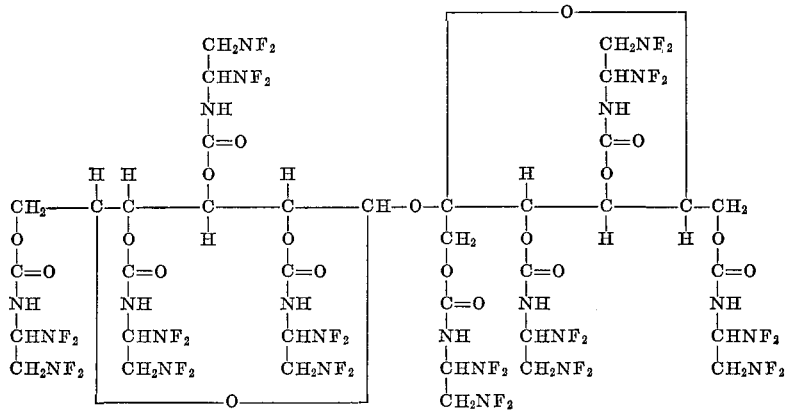

10. A new compound represented by the following formula

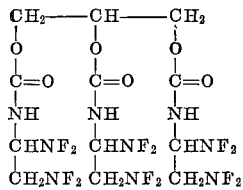

11. A new compound represented by the following formula

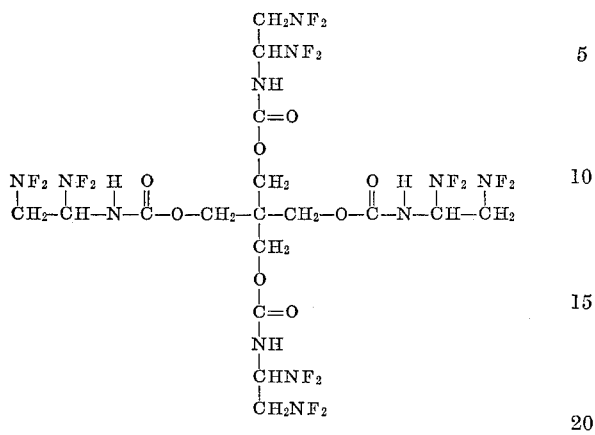

12. A new compound represented by the following formula

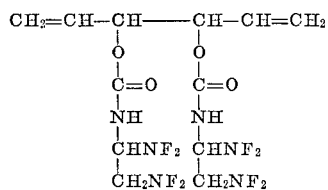

13. A new compound represented by the following formula

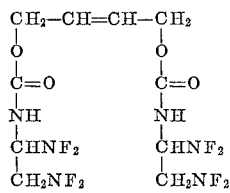

14. A new compound represented by the following formula

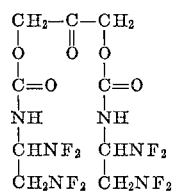

15. A new compound represented by the following formula

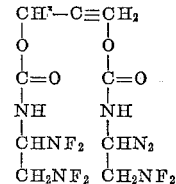

16. A new compound represented by the following formula

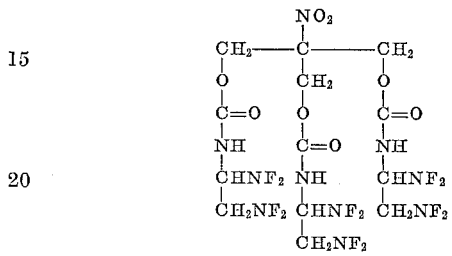

17. A composition of matter represented by the formula

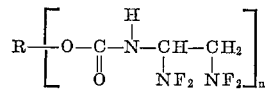

wherein R is a polyvalent radical of the group consisting of (1) a polyvinyl alcohol molecule from which $n$ hydroxyl groups have been extracted and (2) a nitrocellulose molecule from which $n$ hydroxyl groups have been extracted; and $n$ is an integer of from (1) 2 to 30,000 and (2) 2 to 1,000 respectively.

18. A process for the preparation of a urethane containing at least two $-OCONHCH(NF_2)CH_2NF_2$ groups pendent from the backbone structure of the molecule which comprises dissolving a polyvinyl alcohol in dimethyl sulfoxide and thereafter reacting said alcohol with 1,2-bis(difluoroamino)ethyl isocyanate while maintaining the temperature of the reactants below about 45° C.

References Cited

UNITED STATES PATENTS

| | | | |
|---|---|---|---|
| 3,061,629 | 10/1962 | Wyart et al. | 260—471 |
| 3,337,629 | 8/1967 | Smiley | 260—583 |
| 3,347,925 | 10/1967 | Tyler et al. | 260—583 |
| 3,352,828 | 11/1967 | Passannante | 260—77.5 |
| 3,361,689 | 1/1968 | Miegel et al. | 260—13 |
| 3,390,136 | 6/1968 | Leary et al. | 260—77.5 |

DONALD E. CZAJA, Primary Examiner

M. J. WELSH, Assistant Examiner

U.S. Cl. X.R.

260—210 R, 214, 453 AL, 482 B

UNITED STATES PATENT OFFICE
CERTIFICATE OF CORRECTION

Patent No. 3,631,155     Dated December 28, 1971

Inventor(s) Robert A. Smiley

It is certified that error appears in the above-identified patent and that said Letters Patent are hereby corrected as shown below:

Column 12, lines 3-10, the formula should read:

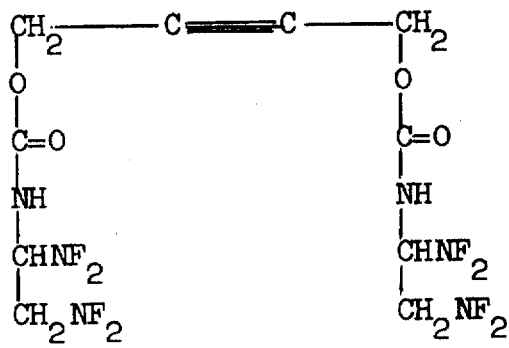

Signed and sealed this 30th day of May 1972.

(SEAL)
Attest:

EDWARD M. FLETCHER, JR.       ROBERT GOTTSCHALK
Attesting Officer      Commissioner of Patents